US 9,255,803 B2

(12) United States Patent
Liu et al.

(10) Patent No.: US 9,255,803 B2
(45) Date of Patent: Feb. 9, 2016

(54) DEVICES, PROGRAM PRODUCTS AND COMPUTER IMPLEMENTED METHODS FOR TOUCHLESS METROLOGY HAVING VIRTUAL ZERO-VELOCITY AND POSITION UPDATE

(71) Applicant: IPOZ SYSTEMS, LLC, Katy, TX (US)

(72) Inventors: Ziwen Wayne Liu, Katy, TX (US); Charles William Tink, Park City, UT (US)

(73) Assignee: IPOZ SYSTEMS, LLC, Katy, TX (US)

(*) Notice: Subject to any disclaimer, the term of this patent is extended or adjusted under 35 U.S.C. 154(b) by 0 days.

(21) Appl. No.: 14/482,150

(22) Filed: Sep. 10, 2014

(65) Prior Publication Data

US 2015/0105943 A1    Apr. 16, 2015

Related U.S. Application Data

(63) Continuation-in-part of application No. 13/752,806, filed on Jan. 29, 2013, now Pat. No. 8,903,576, which is a continuation of application No. 12/856,404, filed on Aug. 13, 2010, now Pat. No. 8,380,375.

(60) Provisional application No. 62/044,494, filed on Sep. 2, 2014, provisional application No. 61/877,504, filed on Sep. 13, 2013, provisional application No. 61/234,062, filed on Aug. 14, 2009.

(51) Int. Cl.
*H04B 11/00* (2006.01)
*G05D 1/00* (2006.01)
*G01C 21/16* (2006.01)
*G01C 15/00* (2006.01)

(52) U.S. Cl.
CPC ............ *G01C 21/165* (2013.01); *G01C 15/002* (2013.01); *G01C 21/16* (2013.01)

(58) Field of Classification Search
CPC ..... G01C 21/165; G01C 15/002; G01C 21/16
See application file for complete search history.

(56) References Cited

U.S. PATENT DOCUMENTS

| 4,315,326 | A | 2/1982 | Chase, Jr. | |
|---|---|---|---|---|
| 8,380,375 | B2 | 2/2013 | Tink | |
| 2003/0078706 | A1* | 4/2003 | Larsen | G01C 21/00 701/21 |
| 2003/0093222 | A1 | 5/2003 | Eiken | |
| 2007/0025185 | A1 | 2/2007 | Green | |
| 2007/0106462 | A1 | 5/2007 | Blain | |
| 2009/0238042 | A1 | 9/2009 | Hawkinson | |

OTHER PUBLICATIONS

International Search Report and Written Opinion for PCT Application No. PCT/US10/045621 dated Sep. 30, 2010. (6 pages).

* cited by examiner

*Primary Examiner* — Mary Cheung
(74) *Attorney, Agent, or Firm* — Bracewell & Giuliani LLP; Brad Y. Chin

(57) ABSTRACT

Embodiments of a metrology device and a computer-implemented method generate survey data without touching the subsea objects being surveyed. The metrology device can include an inertial navigation system (INS) outputting position and orientation data of the metrology device; an aiding device positioned at a known distance and orientation with respect to the INS for collecting image data of the subsea objects; and a computer having one or more computer programs that use the image data to calculate measured velocity of the metrology device at first and second subsea objects to perform virtual zero velocity updates, and uses an apparent difference in the position of the first subsea object measured prior and subsequent to measuring the second subsea object to perform virtual position update.

18 Claims, 10 Drawing Sheets

DEVICES, PROGRAM PRODUCTS AND COMPUTER IMPLEMENTED METHODS FOR TOUCHLESS METROLOGY HAVING VIRTUAL ZERO-VELOCITY AND POSITION UPDATE

RELATED APPLICATIONS

The present application is a non-provisional application which claims priority to and the benefit of U.S. Provisional Patent Application No. 62/044,494 filed on Sep. 2, 2014, titled "Devices, Program Products and Computer Implemented Methods for Touchless Metrology Having Virtual Zero-Velocity and Position Update" and U.S. Provisional Patent Application No. 61/877,504 filed on Sep. 13, 2013, titled "Devices, Program Products and Computer Implemented Methods for Touchless Metrology Having Virtual Zero-Velocity and Position Update." The present application is also a continuation-in-part of U.S. patent application Ser. No. 13/752,806, filed on Jan. 29, 2013, titled "A Device, Program Product and Computer Implemented Method for Touchless Metrology Using an Inertial Navigation System and Laser," which is a continuation of U.S. patent application Ser. No. 12/856,404, filed Aug. 13, 2010, which is now U.S. Pat. No. 8,380,375, titled "A Device, Computer Storage Medium, and Computer Implemented Method for Metrology Using an Inertial Navigation System and Aiding" which claims priority to U.S. Provisional Patent Application Ser. No. 61/234,062, filed on Aug. 14, 2009, titled "A Device and Method for Touchless Inertial Metrology Using an Inertial Navigation System and Laser," each of which is incorporated herein by reference in its entirety.

BACKGROUND OF THE INVENTION

1. Field of the Invention

The invention relates to a method of making measurements on and between existing objects located underwater. More particularly, the invention relates to controlling the drift of an inertial navigation system using a range and bearing image capture system such as a laser camera or other sensors to make measurements without the system being in contact with an underwater object or the seabed. The spatial relationship between the inertial navigation system and the underwater object is achieved by range and bearing measurements.

2. Description of the Related Art

Any motion of an object in space is composed at the microscopic level of two basic motions: micro-rotations and micro-linear motions. An inertial navigation system (hereinafter "INS") measures these motions using gyroscopes (to sense angular motions) and accelerometers (to sense linear motions). The INS may measure rotations using the gyroscope and linear motions using the accelerometers at a high frequency (typically 500 times per second). Even given this high sample rate, the INS is subject to error. Because of the imperfection of the accelerometers and gyroscopes, INS navigation, when not controlled, is subject to a continuous drift of about 0.8 miles per hour in a more accurate INS, and several miles per hour in one that is less accurate.

This drift is especially problematic when the INS is used in underwater metrology i.e., the science of measuring accurately the position and orientation of objects and physical structures underwater (typically on the seabed). The most common metrology consists in measuring the distance between the two flanges of a pipeline system that will receive the ends of a jumper or spool, i.e. the hard, prefabricated connecting pipes that join a pipeline system (typically ending at a manifold) and a wellhead. The accurate measurement of distance between receptacles of the pipeline and the wellhead, to which each end of the jumper is to be attached, is crucial to ensure accurate manufacturing of the jumper. To that end, the exact distance between the pipeline receptacle and the wellhead receptacle, the difference in depth between them and the exact 3D orientation (heading, pitch and roll) of each receptacle must be accurately measured.

To correct for drift in underwater metrology, the INS navigation is sometimes corrected using an "aiding by zero velocity update", or ZUPT method. The ZUPT is a period without motion where the INS is parked on some structure on the seabed: usually either one of the two receptacles that need to be measured. When the INS is parked for at least 15 seconds, the INS recalibrates and corrects any navigation drift from the knowledge that, when there is no motion the readings of the accelerometers and gyroscopes must be caused by noise (pure erroneous measurements). The drawback of such methods is that these require that the INS be carried by a robot (such as a Remotely Operated Vehicle or "ROV"), other vehicles, or a diver, to touch the flange or receptacle (actually: the ROV rests on the receptacle for at least 15 seconds), potentially causing damage. Even more, in order to measure accurately the position and orientation of those flanges, a mating system (stabbing guide) is often specially made and installed on or near the two flanges according to these traditional metrologies which can be extremely cumbersome.

SUMMARY OF THE INVENTION

Accordingly, Applicant has recognized the need for methods and devices that control the drift of an INS used in underwater inertial metrology without touching any seabed structure and, therefore, without the requirement for stabbing guides, thereby allowing for "touchless" metrologies.

Various embodiments of a metrology device for use with an underwater vehicle or diving personnel are described herein. An embodiment of a metrology device, for example, can include an INS having one or more gyroscopes to detect angular velocity and one or more accelerometers for the detection of linear velocity. The INS can be transported by an underwater robotic apparatus or diver and output INS solutions, e.g., position and orientation data. The embodiment of the INS can also include an aiding device having a laser, or other source, positioned in a relationship with an optical scanner so that when a light is emitted from the laser, or other source, the scanner is in a position to determine a characteristic of a reflective light from the laser, or other source, for the purpose of measuring distance and orientation to points of reflection. The aiding device can be positioned so that the distance and orientation between the optical scanner and the INS is known. The aiding device can output laser data, or other ranging data, or orientation data for storage. The embodiment can also include a controller having a microprocessor, a timing device, and memory, with the controller receiving and storing the position and orientation data from the INS and the ranging and orientation data from the laser, or other aiding device, together with time tag data indicating when the data was output from the INS, and when the data was output from the aiding device, before storage. The INS can also include an interface for connecting to a remote control center, with the interface outputting the INS data and the aiding device data from the memory when such output is requested by the remote control center either in near real time, or after the survey. The remote control center, for example, can process all data to determine a measured velocity of the metrology device and a drift of the INS, and thereby allow for precise and accurate navigation measurements.

Moreover, these devices, for example, can allow the INS to precisely locate the objects or structures located on the seabed, and, therefore, precisely measure their position and orientation. These devices, for example, can allow more precise measurement of distances and depth differences between the objects and structures without the need to park the INS on any underwater structure.

Another embodiment of the metrology device includes an INS in a fixed relationship to a laser camera, or other image-capture device, that will remotely measure range and bearing to fixed objects located away from the INS, in order to compute the exact position of these objects first with an error caused by the drift of the INS navigation in real-time, and then the exact position of these objects without error after the navigation drift has been corrected. The laser camera, or other image-capture device, may capture three-dimensional pictures of particular objects on the seabed, while the INS will compute positions associated with these images. All data may be time stamped and recorded. The recorded data may be downloaded at the end of the survey and processed so that the positions of the images captured will be computed. The difference of position between two images of the same object can be used to compute a measured velocity of the metrology device and the drift of the INS navigation. The measured velocity of the metrology device can be determined from two images of the same object measured from two distinct measurement points at two distinct times as the metrology device is moved past the object. The drift of the INS can be determined from two images of the same object measured from two distinct measurement points where the INS indicates that the two distinct measurement points are equivalent. The difference in apparent position of the fixed object is caused by the drift of the INS causing the two distinct measurement points to be non-equivalent. The difference in apparent position may be used to re-compute the remaining position information of the data objects in the survey with great accuracy, and therefore compute precisely, the distance between objects which images have been captured as well as other measurements of use in the offshore oil industry.

Another embodiment of the invention provides a computer-implemented method in which a laser camera, or other image-capture device captures images and an INS stores these images and positions associated with these images. According to an embodiment of the method, these are stored for later processing. An embodiment of the method employs a measured velocity determined from multiple images of a stationary object captured by the laser camera, or other image-capture device, as the INS is moved past the stationary object. In many instances, this will be more accurate than a corresponding velocity calculated from INS accelerometer and gyroscope data. The measured velocity can be used to more accurately correct INS data to maintain an apparent drift of the INS both low and linear. The method also can employ an INS that calculates distances based on the fact that the different positions for a same object arise due to the drift of the INS. The method can include matching the images to transform two images into one image of a single object that includes the information of the distance between the two original images which would have been zero if there was no drift. The method can also include applying the computation of the difference between the two images to correct the navigation drift of the INS. Once reprocessed, the position of the two images will be equal, and the two images will superimpose into one single image. The drift of the INS will have an apparent linear growth with respect to time. The method can include post-processing all position and orientation information for the whole survey to obtain a very accurate result in navigation. The method can also include using this new and accurate navigation to compute the exact distance between objects on the seabed, which has value in the industry for the measurement of jumpers or pieces of pipeline that will be placed between objects on the seabed, this computation referred to as metrology.

The computer programs or computer process that is involved in embodiments of the present invention, for example, can include: the process of associating an INS with a laser camera, or other image-capture device, in a fixed position in space by recording and storing the position of their lever arms in each dimension (X, Y, Z) as well as the measure of their angular difference in the three dimensions (heading, pitch and roll), so that the positions and orientations computed by an INS are mathematically associated with the positions and orientations of the laser camera, or other image-capture device, so that a plurality of pixels or cloud points has a position in three dimensions. This can allow the rebuilding, by computer program or computer process, the object in three dimensions. The computer programs or computer process can further include the routine of starting and navigating the INS and the laser camera, or other image-capture device within the rules of the art of navigation, and time stamping and recording all necessary data which includes INS and laser camera, or other image-capture device, data; the routine of collecting, time stamping and recording a 3-dimensional image or point cloud of each object of interest on the seabed, as well as the INS navigation information simultaneously in some embodiments; the routine of outputting all the time-stamped data to an external computer or memory device at the end of the survey for further processing while checking the integrity of communications. All data can be processed to 1) identify single objects, out of point clouds; 2) associate positions with each object; 3) recognize a given object in different images, when the given object has been captured several times; 4) compute the difference in position associated with that single object on different occasions; 5) compute a velocity of the INS and the drift of the INS navigation between capture of different images of a same object; 6) apply that drift to correct the INS navigation and make it more accurate; and 7) use this more accurate INS navigation solution to output all the deliverables requested by the client of a metrology survey, which includes the distance between several objects, and thus, for example, the necessary length of a pipeline jumper that will join these objects as well as differences in depth and orientations of each objects.

In embodiments of methods, the survey is to be conducted without touching any of the underwater structures being measured. The underwater structures are therefore measurable while the metrology device is in motion with respect to the underwater structures.

BRIEF DESCRIPTION OF THE DRAWINGS

Some of the features and benefits of the present invention having been stated, others will become apparent as the description proceeds when taken in conjunction with the accompanying drawings, in which.

While the invention will be described in connection with certain embodiments, it will be understood that it is not intended to limit the invention to those embodiments. On the contrary, it is intended to cover all alternatives, modifications, and equivalents, as may be included within the spirit and scope of the invention as defined by the appended claims.

DETAILED DESCRIPTION

The present invention will now be described more fully hereinafter with reference to the accompanying drawings in which embodiments of the invention are shown. This invention may, however, be embodied in many different forms and should not be construed as limited to the illustrated embodiments set forth herein; rather, these embodiments are provided so that this disclosure will be thorough and complete, and will fully convey the scope of the invention to those skilled in the art. Like numbers refer to like elements throughout.

An INS is used in underwater metrology to measure the distance between two underwater objects, such as jumper receptacles. An INS uses gyroscopes and accelerometers to measure, respectively, micro-rotational and micro-linear movements to orient the body of a device and track device location. These readings can then be used to measure the distance between the two objects. Because this reading is disposed to error in the form of drift, embodiments of the present invention use a laser scanner, or other types of laser cameras or other distance-measuring sensors, to correct the error. Such a device and method of operation of same has the benefit of being "touchless," i.e., the INS does not have to be parked on a structure and therefore does not need mating guides on the structures to correct any of its own navigation drifts.

Figure 1:
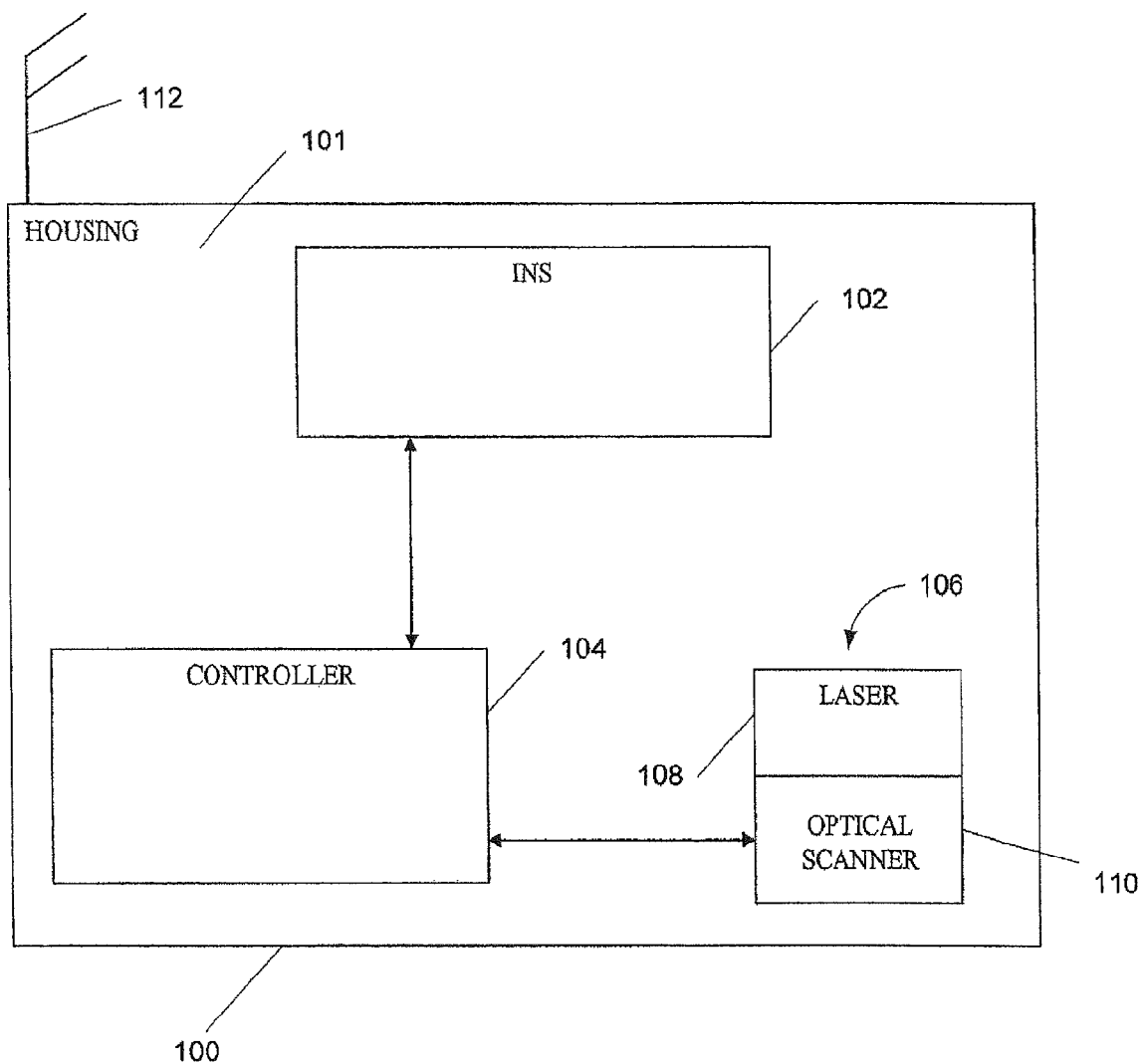
FIG. 1 is a block diagram of a device and system for providing touchless metrology with an INS according to an embodiment of the present invention.

A metrology device 100 used for measuring the position and orientation of underwater objects according to an embodiment of the invention is shown in reference to FIG. 1. Typically, metrology device 100 is an independent tool, transported and operated by an underwater robotic vehicle or a diver to aid in data collection, though the metrology device may also be connected to buoys or other flotation devices, underwater submarines, and like vehicles or tools. Metrology device 100 includes a housing 101, an INS 102, a controller 104, an aiding device 106, using, for example, a laser 108 and an optical scanner 110, and communications network interface 112. Laser 108 and optical scanner 110 might also be a laser camera such as "flash laser cameras" or any other distance-measuring sensor. The metrology device 100 may be connected to an ROV or control center using the communications network interface 112, e.g. a transceiver (not shown), modem, or the like.

The INS 102 provides measurements of the location and orientation of various objects and includes, for example, three gyroscopes and three accelerometers located on three perpendicular axes (not shown). Examples of an INS that may be used in the system include the T24 manufactured by Kearfott, the PHINS manufactured by Ixsea, or another INS. The INS 102 provides full 3-dimensional position and orientation data by measuring rotational and linear motions, at a very high frequency, for example, 500 HZ, and then integrates the data to generate the position. The INS 102 is connected to and controlled by controller 104.

Aiding device 106 is also connected to controller 104. Aiding device 106 includes an image-capture device, including, for example, laser 108 and optical scanner 110. Laser 106 can be any laser suitable for use in gathering of image data, for example, a semi-conductor based laser, and optical scanner 110 may be a camera, lens, optical deflector, or other device. As one skilled in the art will appreciate, aiding device 106 may also be a flash laser camera or other device having the functions of a laser and optical scanner. If aiding device 106 is embodied as a laser 108 and optical scanner 110, aiding device 106 may use either a "time of flight" technique or a "triangulation" method to extrapolate 3-D "pictures" of an object. As one skilled in the art will appreciate, if the aiding device 106 uses a triangulation technique, aiding device 106 will employ a laser 108 and an optical scanner 110 having, for example, a camera and lens. In such a device, a light emitted from laser 108 in either a dot or stripe is reflected back through a lens to a camera. The position of the reflected light in the camera is used to obtain data about the object. If aiding device 106 uses a time of flight technique, aiding device 106 uses laser 108 and an optical scanner 110 in the form of a sensor to capture the reflection of light from laser 108. The time it takes for light to make a round trip from the laser to the object and back to the deflector is used to calculate the distance between metrology device 100 and the object. If aiding device 106 is a flash laser camera, all orientations and ranges are collected simultaneously (in one flash). For either technique, a plurality of data points is collected, and these points are used to form the 3D "picture" of the object referred to hereafter.

Though shown having an antenna, metrology device 100 and various computer components associated with a control center may be connected together using a variety of communications network interfaces 112. As one skilled in the art will appreciate, the communications network interface 112 can connect the metrology device 110 to external components using a transceiver, modem, I/O device interface, etc., and the communications network may be a wireless network, local area network ("LAN") or wide area network ("WAN"), or a combination thereof. For example, the metrology device 100 may be connected to a control center using a transceiver, modem, or other data connection port via optical fiber or a wireless network, and the control center may be a privately networked (LAN) set of computer components to allow for faster data processing, or metrology device 100 may be in direct communication with a remote operated vehicle ("ROV") controller using, e.g., I/O ports, with the ROV connected to a surface control station using optical fiber or a wireless communication network. In another configuration, metrology device 100 may store all collected data, and connect via a surface- or rig-located I/O device interface to a computer network that uses e.g., a WAN or LAN to connect to a control station for data processing. Accordingly, though not all such configurations are depicted, all are within the scope of the disclosure.

Figure 2:
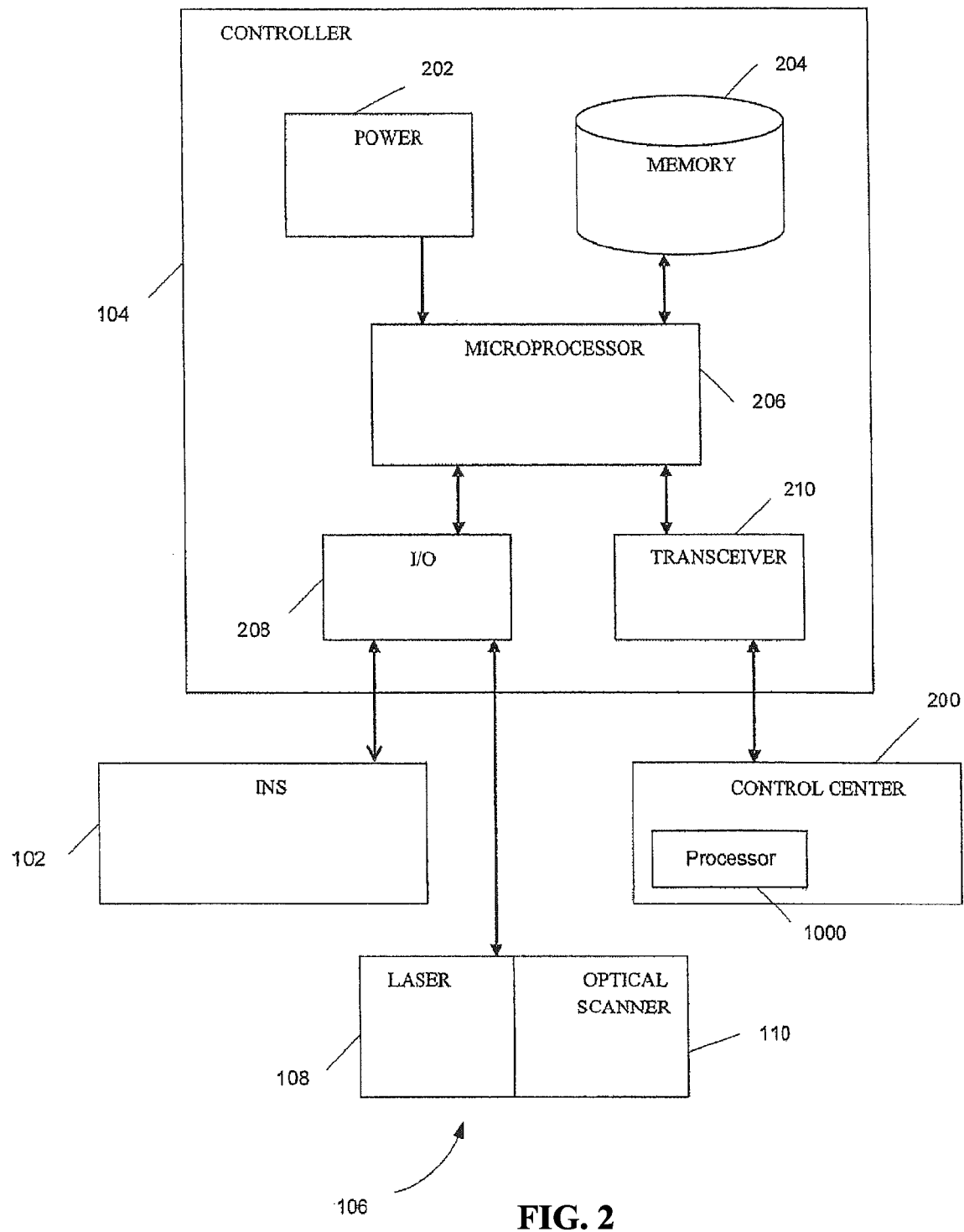
FIG. 2 is a block diagram of a controller used in a device or system to provide touchless metrology with an INS according to an embodiment of the present invention.
Figure 4:
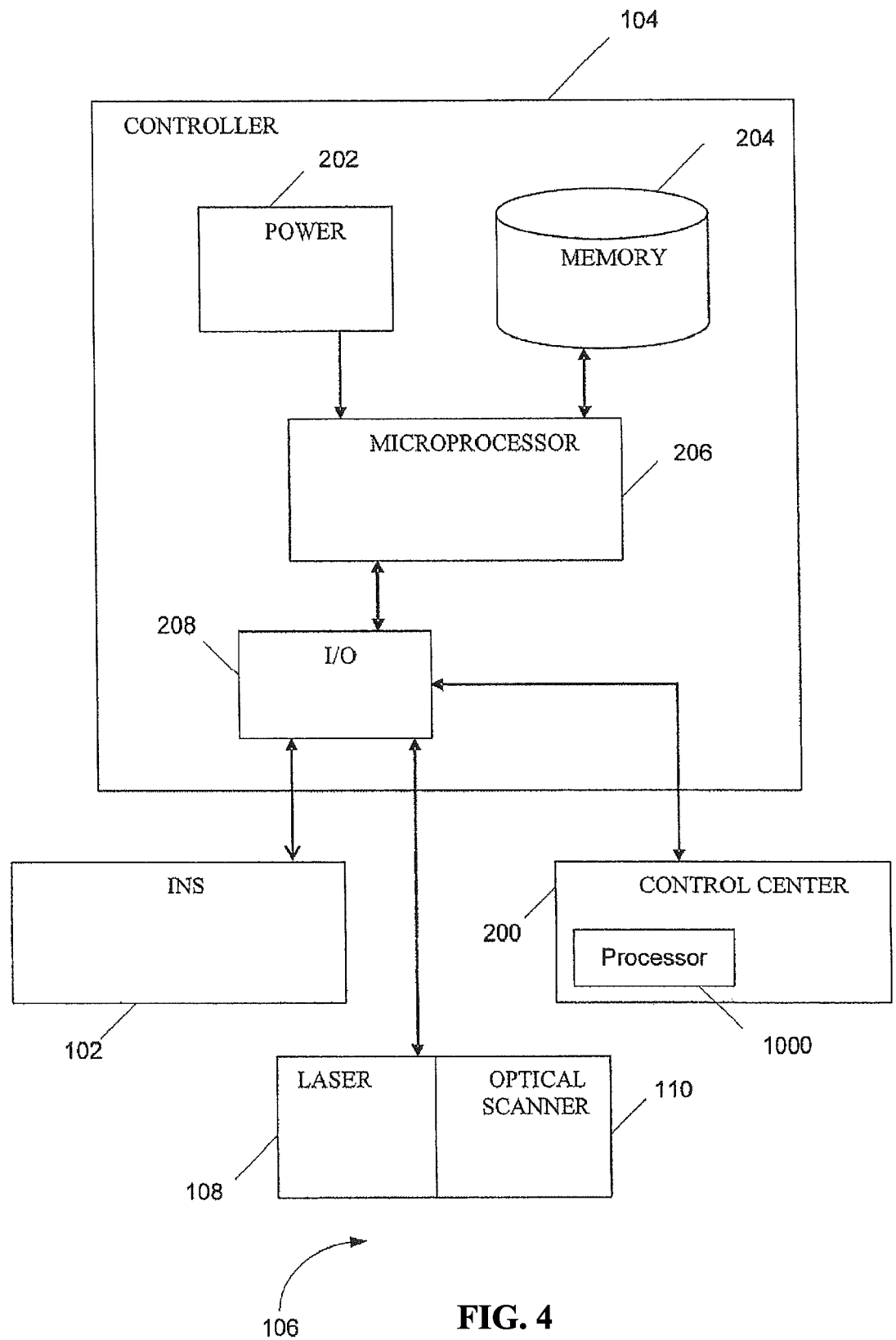
FIG. 4 is a block diagram of a controller used in a device or system to provide touchless metrology with an INS according to an embodiment of the present invention.

Controller 104 is connected to both the INS 102 and aiding device 106 to enable the time tagging, calculation and processing of measurement readings, as well as to control functionality of same. Controller 104 is depicted in FIG. 2. In general, controller 104 includes a power supply 202, a memory (or data storage) 204, a microprocessor 206, an input/output ("I/O") device interface 208 and a transceiver 210. Alternatively, as shown in FIG. 4, a transceiver may not be employed for remotely connecting the metrology device 100 to a control center. Instead, in the embodiment of FIG. 4, a control center 200 is directly connected to an I/O device interface 208. The control center 200, for example, maybe part of the control electronics of the ROV. In alternative embodiments, control center 200 might be the remote control station or other intermediary data collection point (such as computers located on an offshore rig), and as such, data would be stored in memory 204 and uploaded to the control center once the ROV surfaces or transmitted using the ROV communication connection to the remote control station. Accordingly, all of these embodiments are within the scope of this disclosure.

Returning to FIG. 2, power supply 202 supplies and regulates power to the various components of microprocessor 206, and includes power electronics with voltage transformation and regulation, plus typically a battery, and one of its connectors would typically be connected by cable to a robot or other vehicle carrying metrology device 100. The battery would maintain 2 functionality of the whole system if the power is interrupted or corrupted, or not connected to the vehicle. Power supply 202 is connected to microprocessor 206, which will be described in detail below. Memory 204 is also connected to microprocessor 206 and stores measurement and program data for use by microprocessor 206. As such, memory 204 may include both non-volatile memory, e.g., hard disks, flash memory, optical disks, and the like, and volatile memory, e.g., SRAM, DRAM, SDRAM, etc., as required to process embodiments of the instant invention. As one skilled in the art will appreciate, though memory 204 is depicted on, e.g., the motherboard, of the controller 104, memory 204 may also be a separate component or device, e.g., FLASH memory, connected to the controller 104.

I/O device interface 208 and optionally, e.g., a transceiver 210, may provide the communications network interfaces 112 for controller 104 (not including any external power source for power supply 202). I/O device interface 208 is a standard computing interface and may be any I/O device interface including, but not limited to a network card/controller connected by a PCI bus to the motherboard, or hardware built into the motherboard to connect microprocessor 206 and memory 204. Optional transceiver 210 if used is connected to the microprocessor and allows metrology device 100 to communicate with a remote control center 200 for the purposes of data collection and determining measurement locations, in case this data collection is done remotely. As one skilled in the art will appreciate, transceiver 210 is any device capable of sending and receiving data signals at a particular frequency, and includes all filters, modulators, demodulators and other devices required to achieve this end Microprocessor 206 performs the basic computer operations of controller 104. This includes, but is not limited to, all of the program functions, control of all periphery devices including INS 102 and aiding device 106, read/write operations, clock functions, etc. As one skilled in the art will appreciate, microprocessor 206 may be any processor capable of handling the data collection requirements of the metrology device 100. For example, a 64 bit processor like AMD 64, INTEL 64, or e.g., Intel® Xeon® multicore processors, Intel® micro-architecture Nehalem, AMD Opteron" multicore processors, etc., depending upon the number and complexity of measurements and number of laser points scanned by aiding device 108 could be used.

Microprocessor 206 executes instructions stored in memory 204 to perform the inventive data collection functions. In an embodiment of the invention, these instructions may include measuring data from the first subsea object 2000, the second subsea object 2002, and the navigated subsea object, these data including data from the INS 102 and aiding device 106, such as position, range, orientation, and image data. The instructions may include deriving a measured velocity of the metrology device from data procured by the aiding device from at least one of the first subsea object 2000, the second subsea object 2002, or the navigated first subsea object. The instructions may further include correcting data from the INS 102 with the measured velocity such that the drift of the INS 102 grows linearly with time, calculating a drift correction for the INS responsive to a difference between the first subsea object 2000 position and the navigated subsea object position, measuring a target 2004 position responsive to collecting target object data from the controller, determining a proportion of drift correction attributable to the measurement of the target position by determining a proportion of time elapsed between measuring the first subsea object 2000 data and the target object 2004 data, and correcting the measured position of the target 2004 responsive to the determined proportion of the drift correction.

Figure 3:
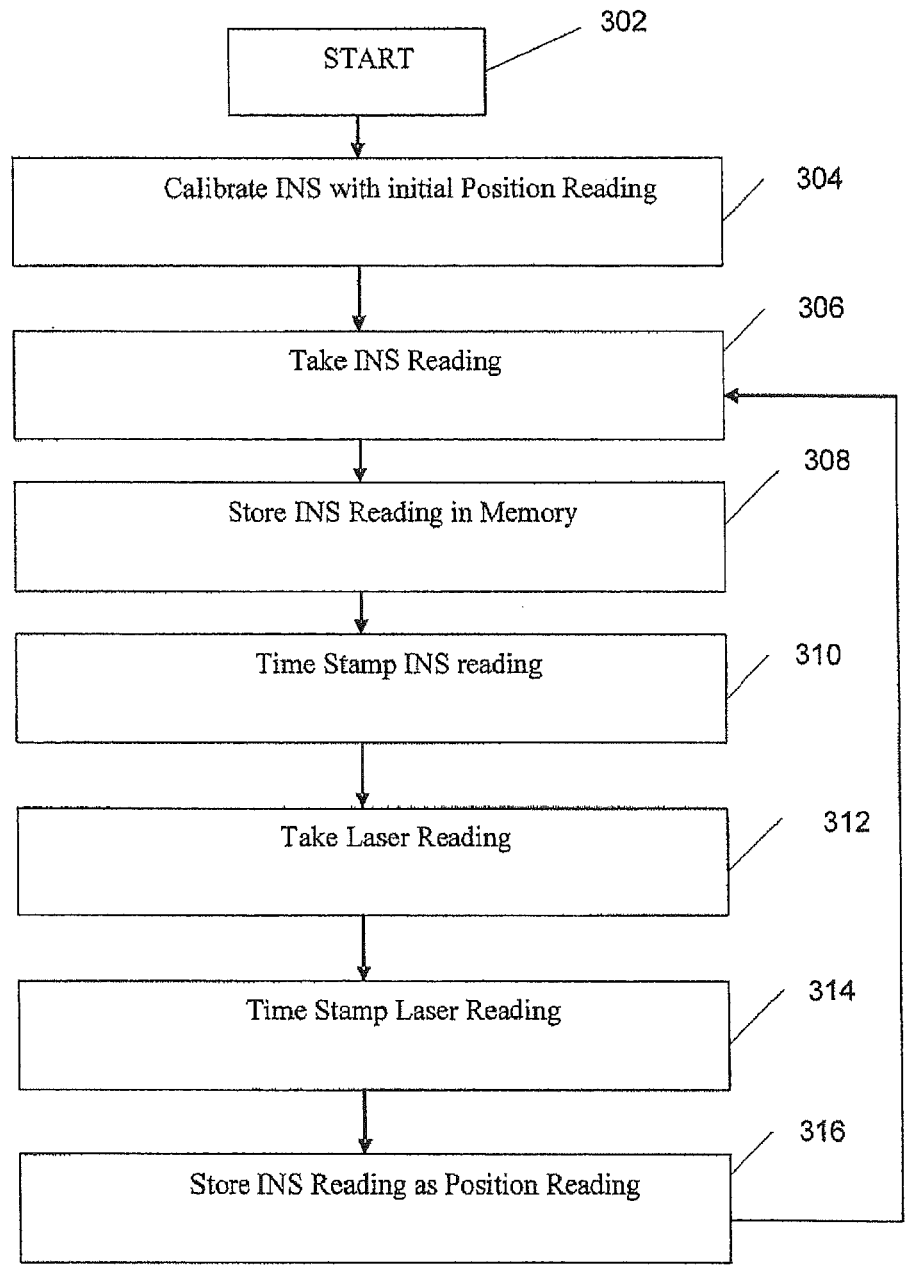
FIG. 3 is a flow diagram of the operation of instructions executable on a microprocessor of FIG. 2 according to an embodiment of the invention.

A general flow chart depicting instructions executed by microprocessor 206 for recording data at each of the subsea objects is shown in FIG. 3. As shown, the metrology device 100 is mounted and initially calibrated, and the data collection process starts, and all of the sensors are powered on (step 302). When INS 102 is powered on, microprocessor 206 uses information about the position of metrology device 100 to align INS 102 (step 304). To align, the INS 102 automatically measures all forces using its gyroscopes and accelerometers e.g., the earth's rotation and gravity, to precisely locate the North direction and the vertical vector. This orientation is called alignment (or calibration). After a short period of alignment (20 minutes or so), the INS begins navigating, meaning it continuously computes and outputs its position and orientation, even when it is being moved (step 306). The INS reading is stored in memory (step 308), and time stamped (step 310). Microprocessor 206 takes a measurement reading using image-data from aiding device 106 (step 312), time stamps the measurement reading, and stores it in memory (step 314). The INS reading is stored as a position reading and a new INS reading is taken (step 316). At this point, the position reading and image data may be continuously transmitted to a control center using e.g., the transceiver, modem, etc.; but may also be stored in memory as a backup or to be uploaded to the control center 200 at a later time. Moreover, it is possible that the INS readings are time stamped and recorded virtually simultaneously with the measurement readings from the aiding device. In this way, data processing requirements including data rates of microprocessor 206 can be controlled.

Figure 5:
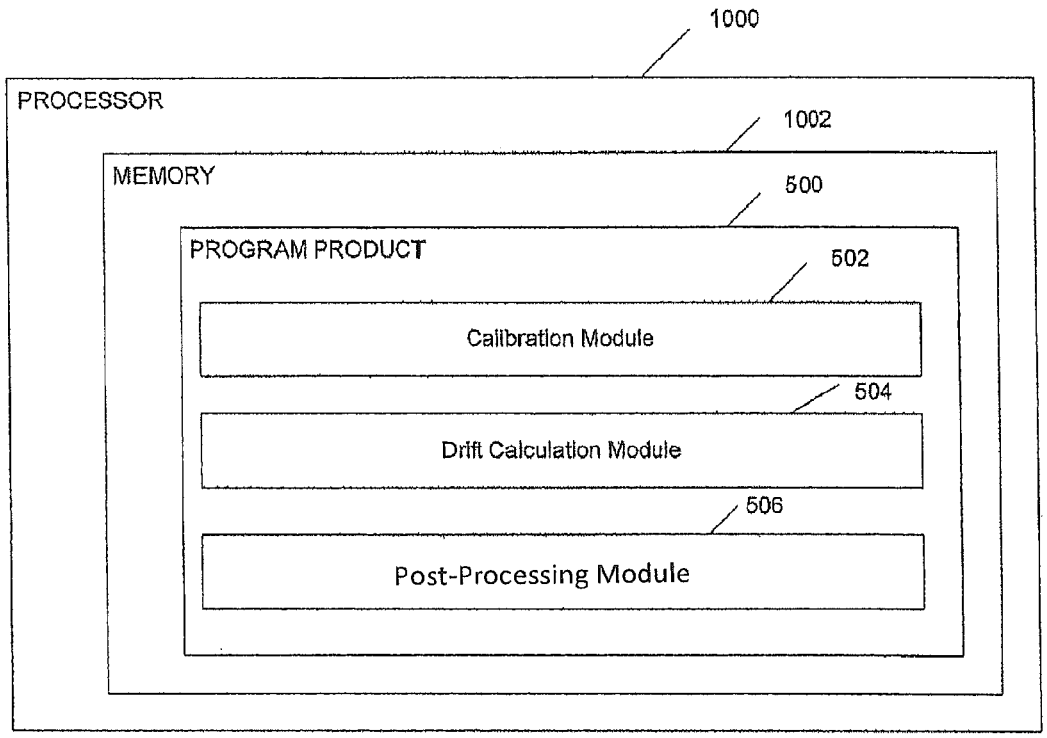
FIG. 5. is a block diagram of a processor having a memory and a program product disposed therein for providing control signals to a touchless metrology INS device and system according to an embodiment of the invention.

Returning to FIG. 2 and FIG. 4, the data collected by the metrology device 100 is collected and transmitted to the control center 200 for processing using the methods described herein. As one skilled in the art will appreciate, the control center 200 may also control the metrology device and ROV. As such, the control center may be located at the surface and connected to the metrology device and ROV via transceiver, modem, or the like over e.g., optical fiber; or alternatively may be devices located on the ROV. To perform the functions thereof, the control center 200 includes a computer having a processor 1000 and a processor memory 1002 (FIG. 5). Though depicted as separate from the metrology device controller 104, as one skilled in the art will appreciate, there are some configurations where the metrology device controller 104 and control center 200 are the same device or computer.

Though not depicted, an I/O device interface, transceiver, modem, etc., may provide a communications interface between the control center 200 and metrology device 100. In some configurations, an I/O device interface would be a standard computing interface and may be any I/O device interface including, but not limited to a network card/controller connected by a PCI bus to the motherboard, or hardware built into the motherboard to connect processor 1000 and processor memory 1002 to the metrology device 100. Optionally, a modem or transceiver can be used to connect the processor to the metrology device 100 and allows metrology device to communicate with a remote control center 200 for the purposes of data collection and determining measurement locations, in embodiments where data collection is done remotely. As one skilled in the art will appreciate, such a transceiver or modem may be any device capable of sending and receiving data signals at a particular frequency, and includes all filters, modulators, demodulators and other devices required to achieve this end.

Processor 1000 performs the basic computer operations of control center 200. This includes, but is not limited to, all of the program functions, including high-level control of the ROV, metrology device, or other components of the system. As one skilled in the art will appreciate, processor 1000 may be any processor capable of handling the data processing requirements for the metrology device 100. For example, an Intel® Xeon® multicore processors, Intel® micro-architecture Nehalem, AMD Opteron" multicore processors, etc., or simpler processor could be used depending upon the number and complexity of measurements and number of laser points scanned by aiding device 108.

As one skilled in the art will appreciate, memory 1002 (FIG. 5) may include both non-volatile memory, e.g., hard disks, flash memory, optical disks, and the like, and volatile memory, e.g., SRAM, DRAM, SDRAM, etc. As one skilled in the art will appreciate, though memory 1002 is depicted on, e.g., the motherboard, of the control center 200, memory 1002 may also be a separate component or device, e.g., FLASH memory, connected to the control center 200. Importantly, memory 1002 stores program product 500 thereon to perform several of the control functions of the instant invention.

As shown in FIG. 5, memory 1002 includes program product 500 having several program modules disposed thereon including a calibration module 502, a drift calculation module 504 and a post-processing module 506, to perform many of the control functions of the instant invention. As one skilled in the art will appreciate, each of these programming modules includes sets of instructions that enable the metrology device to produce accurate measurement data of the field using image data and INS data. As one skilled in the art will appreciate, each of the calibration module 502, drift calculation module 504 and post-processing module 506 may include various other modules and sub-modules to perform the operation thereof, and accordingly the description of these modules are by way of example and are not intended to limit the disclosure to the three modules described herein. Moreover, though some of the modules may be described as initiating other modules, this is not necessary and each module may operate as independent processes. For example, the drift calculation module may be executed on one date and the post-processing module executed at another date. In addition, the various modules may be initiated at any time to check data, e.g., drift calculations, etc.

Figure 6:
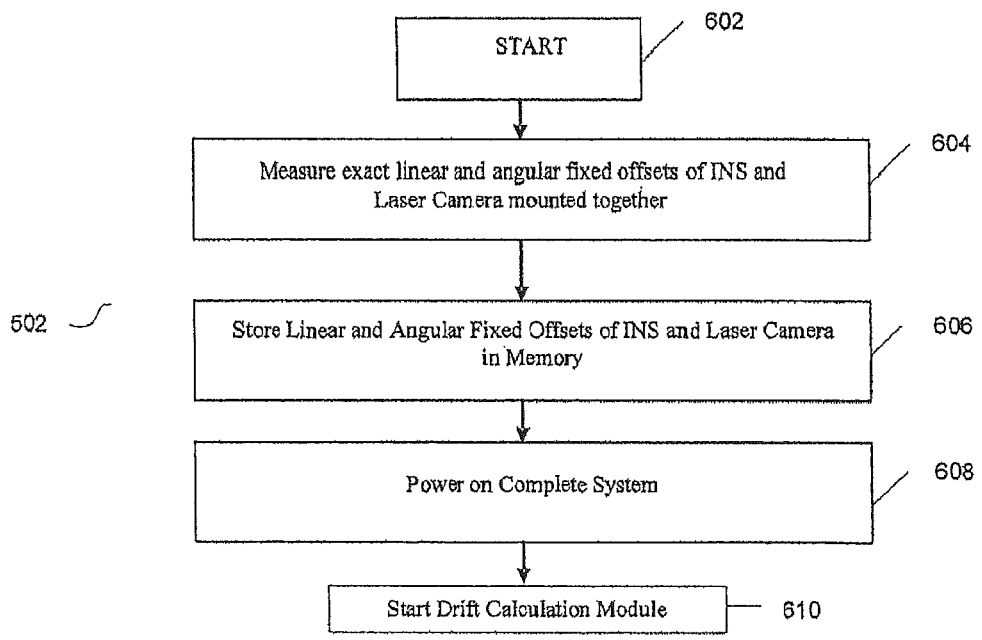
FIG. 6 is a flow diagram for a calibration module shown in FIG. 5 according to an embodiment of the invention.

Calibration module 502 is run upon the initial calibration of the metrology device and power-on operations, and as such includes instructions to perform these functions as shown in FIG. 6. The calibration module 502 is initiated at the time of powering of the INS but does not need the rest of the metrology device 100 to be powered on. In such instances, the INS 102 and aiding device 106 are mounted in the device in a known configuration so that the linear and angular offsets may be calculated (step 604). To do this, complete 3D lever arms and boresight angles between the INS and the aiding device 106 are fixed by measuring and storing the position of the lever arms in each dimension (X, Y, Z) as well as the measure of each angular difference in the three dimensions (heading, pitch and roll), so that the positions and orientations computed by an INS are mathematically associated with the positions and orientations of the camera or similar device. The calculated linear and angular offsets are stored in the control center 200 memory 1002 to be used by the other modules (step 606). Finally, the complete metrology device 100 may be powered on (step 608), and the drift calculation module 504 called.

Figure 7:
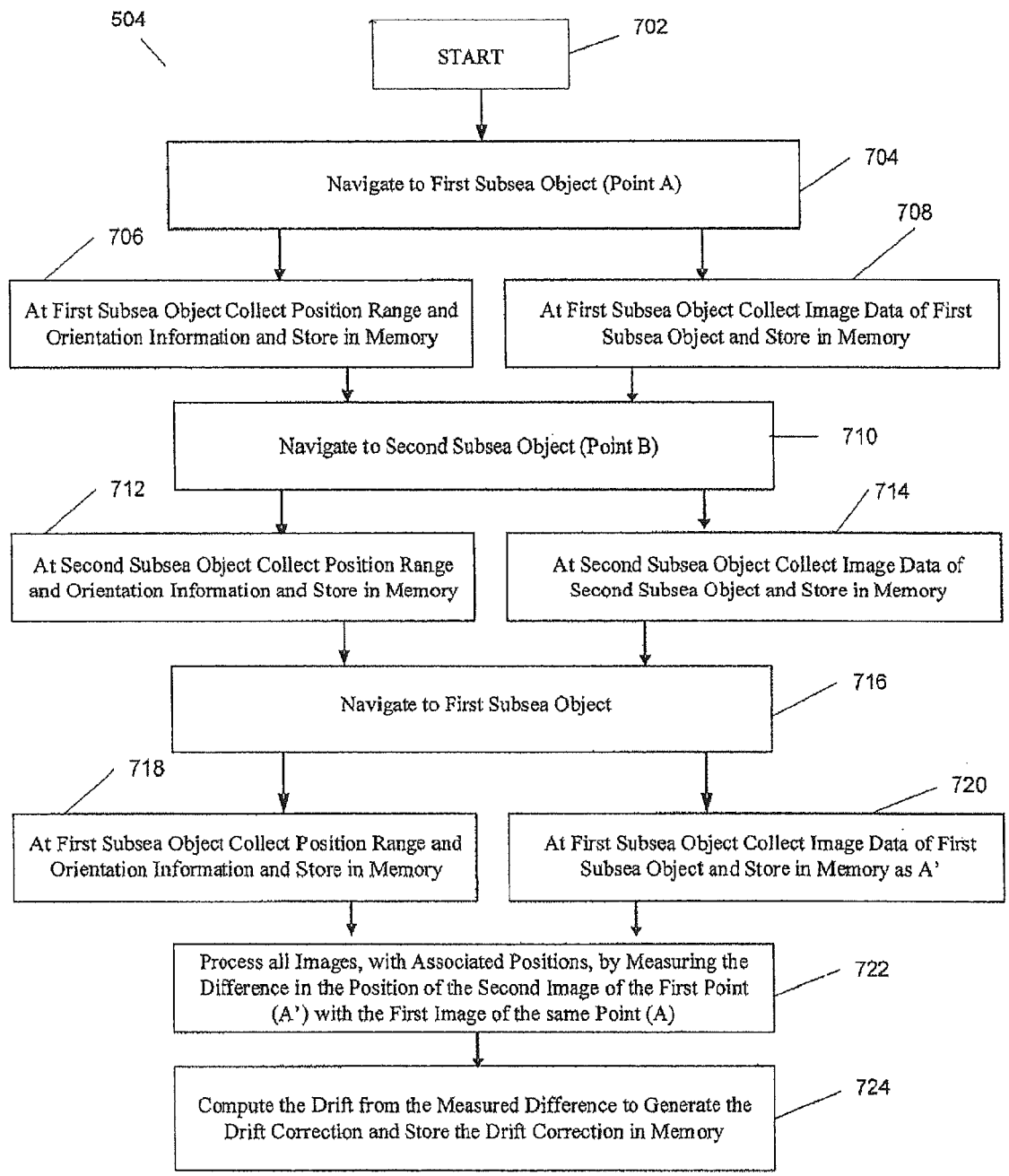
FIG. 7 is a flow diagram for a drift calculation module shown in FIG. 5 according to an embodiment of the invention.
Figure 9:
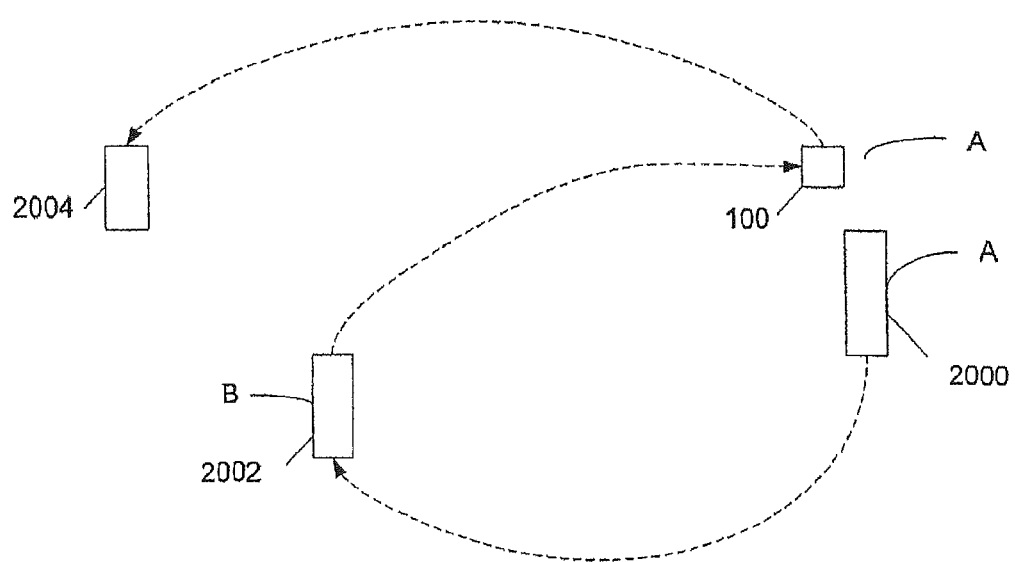
FIG. 9 is a diagram of the metrology device in operation surveying a plurality of subsea structures according to an embodiment of the invention.

Drift calculation module 504 is run to calculate the drift of the metrology device 100 for a particular data field of objects, and is run upon the initiation of the metrology device 100 for such field as shown in FIGS. 7 and 9. The drift calculation module is initiated (step 702) and the vehicle carrying the metrology device 100 is instructed to navigate to the first subsea object 2000, point A (step 704). Point A is a point at which first subsea object 2000 is measurable with aiding device 106, and may include points directly above subsea object 2000 or offset from subsea object 2000 in any direction. It is not necessary for metrology device 100 or the vehicle carrying metrology device 100 to touch subsea object 2000 from point A. In some embodiments, simultaneously, the first subsea object data is collected from the aiding device, the data including position, range and orientation data, and stored in memory (step 706); and image data is captured of the first subsea object 2000 and stored in memory (step 708). Then, the metrology device 100 is navigated to a second subsea object 2002, point B (step 710). Point B is a point at which second subsea object 2002 is measurable with aiding device 106, and it is not necessary for metrology device 100 or the vehicle carrying metrology device 100 to touch second subsea object 2002 from point B. In some embodiments, simultaneously, the second subsea object data is collected from the aiding device, the data including position, range and orientation data, and stored in memory (step 712); and image data is captured of the second subsea object and stored in memory (step 714). The metrology device 100 is then navigated back to the first subsea object 2000 (step 716), but its navigated position is displaced from point A due to the drift of the metrology device, so the displaced position of the metrology device is defined as point A'. In embodiments, simultaneously, the first subsea object data for point A' is collected from the aiding device, the data including position, range and orientation data, and stored in memory (step 718); and image data of point A' is captured of the first subsea object and stored in memory (step 720). After data is collected for points A, A' and B, the images are processed along with associated positions of the metrology device at each of the points, and the difference in position between points A and A' are measured (step 722). Finally, the drift is computed from the measured difference (step 724), and the drift is stored in memory.

Figure 8:
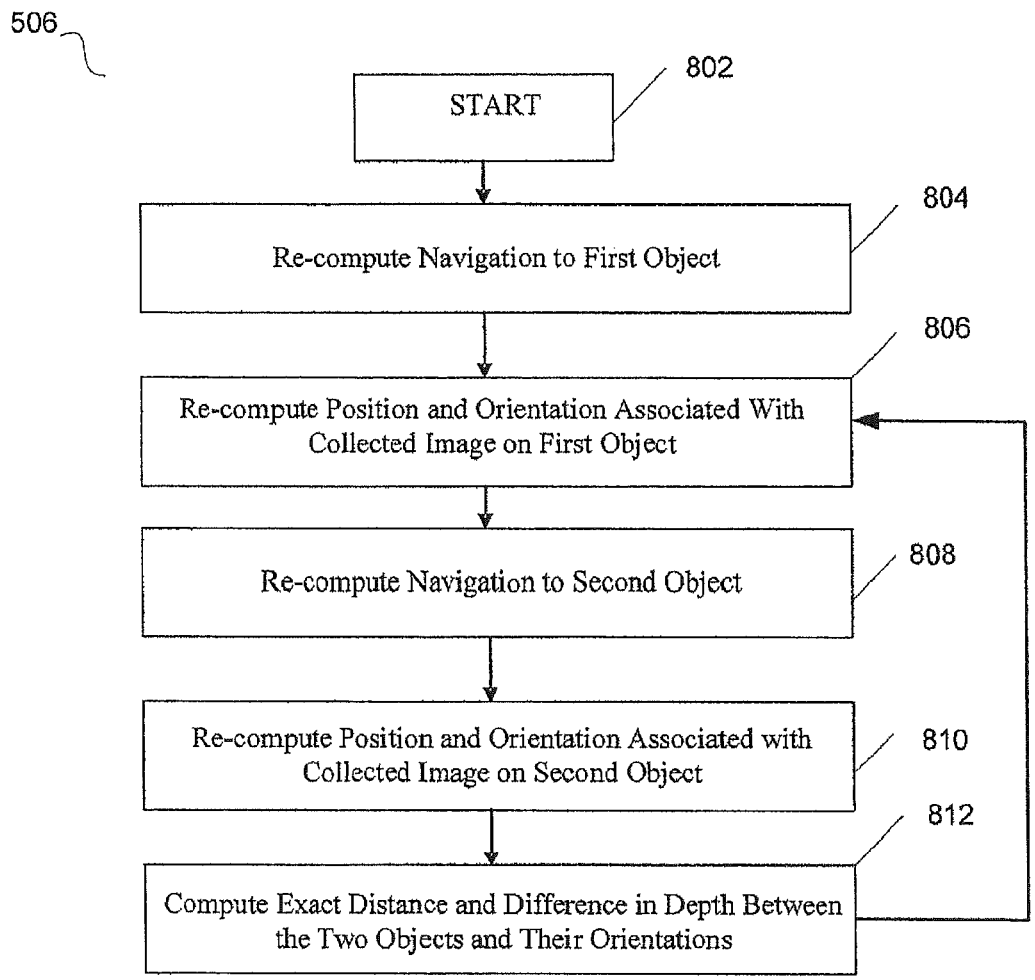
FIG. 8 is a flow diagram for a post-processing module shown in FIG. 5 according to an embodiment of the invention.

Post-processing module 506 is run to correct measurements of distances between objects by correcting for any drift in the metrology device 100. This module is run after the drift calculation module to complete object measurements as shown in FIG. 8 and FIG. 9. The post-processing module 506 is initiated in step 802. Once the post-processing module is initiated, the distance of the metrology device 100 from the start of navigation to the first subsea object 2000 (step 804) is re-computed. Position, range, and orientation collected for point A 2000 are re-computed (step 806) and stored in memory. Using the drift calculation generated by the drift calculation module 504, the precise measurement of the position, range, orientation collected for the second subsea object 2002 is calculated (step 808) and stored in memory (step 810). Finally, the distance and difference in depths between the two objects and their orientations are computed (step 812). As one skilled in the art will appreciate, a particular section of survey is calculated with the same drift, but drift is recomputed for different sections of survey. Accordingly, metrology device 100 may gather additional data for drift calculation between the first subsea object 2000 and target 2004. In such instances, the post-processing module would proceed to calculate the drift and then correct the drive between the first object 2000 and target 2004 immediately after computing the drift and correcting the measurements between the first subsea object 2000 and second subsea object 2002.

It will be understood by those skilled in the art that INS navigation accuracy may degrade over time if not aided. Such degradations in accuracy are called drifts. One contributing factor to INS drifts are sensor imperfections. For example, actual sensors such as gyroscopes and accelerometers may be constructed with a bias that causes readings from these sensors that deviate from those of an ideal sensor. Over time, these deviations will contribute to a cumulative error in INS solutions generated by using these biased readings. Although over a short period of time, the INS drifts grow relatively linearly and allow for an accurate estimation that can be removed from INS solutions, the INS drifts grow non-linearly over longer periods when not aided, causing difficulties in their estimation and removal from the INS solutions. To minimize the INS error growth, especially to keep the error growth linear, external aiding information such as velocity and position measurements are often used. When the INS can be docked on the seabed or subsea objects 2000, 2002, the external velocity is zero and precisely known. Any detected velocity is caused by "noise," or sensor imperfection, and is removed to determine actual velocity. Hence, a Zero-Velocity Update (ZUPT) can be performed to effectively keep the INS error growth linear.

In the touchless metrology case, external aiding information can be applied to embodiments of the present invention via the following processes: VZUPT (Virtual Zero-Velocity Update) and VPUPT (Virtual Position Update). Specifically, the VZUPT process allows for INS solutions to be generated with linear error growth. Second, the VPUPT process allows for a position of a subsea object to be determined accurately and to reinitialize INS solutions. These two processes are described as follows.

First, the VZUPT process derives its name from the ZUPT method described above in which an INS is recalibrated at a known velocity of zero. The VZUPT process allows for calibration of an INS system at a non-zero velocity, hence the name "virtual" zero velocity update. According to embodiments of the present invention, the velocities of INS 102 aboard metrology device 100 are non-zero. The velocities calculated by INS 102 include both dynamic movements of the metrology device 100 and INS navigation drifts associated with INS 102. To aid the INS navigation, the velocities of metrology device 100 should be derived without the influence of INS navigation drifts. This can be achieved using the apparent change in position of first and second subsea objects 2000, 2002 determined from a plurality of measurements of the first and second subsea objects 2000, 2002 from different points at different times as illustrated with reference to FIG. 10 described below.

Figure 10:
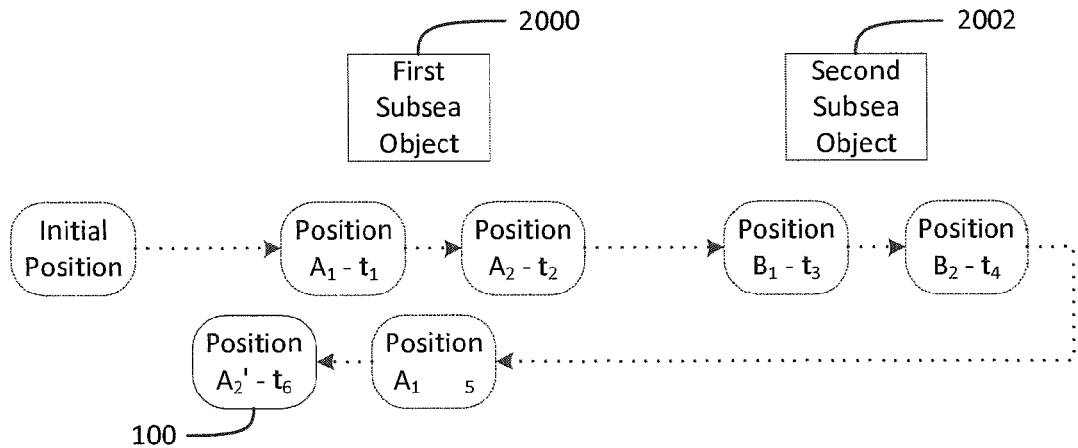
FIG. 10 is a schematic diagram of the metrology device in operation surveying subsea structures according to an embodiment of the invention.

In an embodiment of the present invention, as illustrated in FIG. 10, metrology device 100 begins navigation at an initial position and makes a first measurement of first subsea object 2000 at point $A_1$. This first measurement is used throughout the survey as the known position of first subsea object 2000. At first measurement point $A_1$ the aiding device 106 (FIG. 1) of metrology device 100 is employed to determine a relative position $P_1$ of first subsea object 2000 with respect to the metrology device 100 at a time $t_1$. Metrology device 100 is then moved to a second measurement point $A_2$ with respect to first subsea object 2000, and a relative position $P_2$ of the first subsea object 2000 is determined at a time $t_2$. In some embodiments, metrology device 100 moves between measurement points $A_1$ and $A_2$ at a constant velocity or velocity estimated to be constant. First and second measurement points $A_1$ and $A_2$ are sufficiently proximate to first subsea object 2000 to permit the imaging sensors in aiding device 106, e.g., optical scanner 110 (FIG. 1) to "see" or detect first subsea object 2000. Because the relative position measurements of the imaging sensors in the aiding device 106 do not drift over time, a velocity V of metrology device 100, therefore, can be derived by dividing the position differences over the time differences according to equation (1) below.

$$V = \frac{P_1 - P_2}{t_1 - t_2} \quad (1)$$

Metrology device 100 is then moved to first and second measurement points $B_1$ and $B_2$ with respect to second subsea object 2002 at respective times $t_3$ and $t_4$. First and second measurement points $B_1$ and $B_2$ are sufficiently proximate to second subsea object 2002 to permit the optical imaging sensors in aiding device 106 to detect second subsea object 2002, and in some embodiments, first and second measurement points $B_1$ and $B_2$ are sufficiently remote from first subsea object 2000 such that the imaging sensors in aiding device 106 cannot fully detect first subsea object 2000. In some embodiments, first and second subsea objects 2000, 2002 are separated by 100 meters or more making simultaneous detection of first and second subsea objects 2000, 2002 unachievable using conventional imaging sensors in some subsea environments. In other embodiments, first and second subsea objects 2000, 2002 are separated by any distance including those distances in which simultaneous detection of both subsea objects 2000 and 2002 is achievable with aiding device 106.

At first and second measurement points $B_1$ and $B_2$, aiding device 106 is again employed to measure respective relative positions of the metrology device 100 and the second subsea object 2002, and velocity calculations similar to those made at first and second measurement points $A_1$ and $A_2$ can be made for metrology device 100. Metrology device 100 is then navigated to a measurement point $A_1'$ at which the metrology device 100 has navigated sufficiently close to the first subsea object 2000 such that imaging sensors in aiding device 106 can again detect first subsea object 2000 after traveling to measurement points $B_1$ and $B_2$. A relative position between first subsea object 2000 and metrology device 100 is measured at measurement point $A_1'$ with aiding device 106. Although not required in each embodiment, as will be understood by those skilled in the art, in some embodiments, for example, measurement point $A_1'$ is the location which the INS solutions would indicate was first measurement point $A_1$. As described above, in these embodiments, measurement point $A_1'$ is displaced from first measurement point $A_1$ due to the drift of INS 102. A relative position between first subsea object 2000 and metrology device 100 at measurement point $A_1'$ is determined at time $t_5$ and stored. Additional velocity calculations can be made by moving the metrology device 100 to measurement point $A_2'$ at time $t_6$, and again determining a relative position of the first subsea object 2000.

As indicated above, in other embodiments, measurement point $A_1'$ is not necessarily exactly the location which the INS solutions would indicate was first measurement point $A_1$. In these embodiments, measurement point $A_1'$ is any location at which both INS data and data from the aiding device 106 can be obtained for the first subsea object 2000 subsequent to measuring a relative position between the metrology device 100 and second subsea object 2002. For example navigated measurement point $A_1'$ could be the same location as measurement point $B_2$ as long as first subsea object 2000 is detectable by the imaging sensors of aiding device 106 from measurement point $B_2$. In other embodiments metrology device 100 is navigated from measurement point $B_2$ toward first subsea object 2000 to arrive at navigated measurement point $A_1'$ as illustrated in FIG. 10. The drift of the INS can be determined by comparing the INS data and aiding device data between the two encounters with the first subsea object 2000, e.g. the data generated by measurements of the first subsea object 2000 made prior and subsequent to measurement of second subsea object 2002.

Although the velocity V of metrology device 100 is described as being calculated only once per encounter with each of subsea objects 2000 and 2002, one skilled in the art will recognize that a greater number of velocity calculations can yield more accurate INS solutions. In some embodiments, hundreds, thousands or millions of relative position measurements are taken at known times with aiding device 106 while each of subsea objects 2000 and 2002 are within range of the optical scanner 110 of aiding device 106. In some embodiments, position measurements are taken with aiding device 106 at a rate of 10 times per second while a subsea object 2000, 2002 is in range. Additionally, other stationary subsea structures (not shown) between first and second subsea objects 2000, 2002 can be measured with aiding device 106 to calculate a measured velocity V. A plurality of velocities are calculated by differentiating any combination of these optical scanner measurements, and the plurality of calculated velocities are input into INS 102 to keep the error growth of INS 102 minimized and linear.

Figure 11:
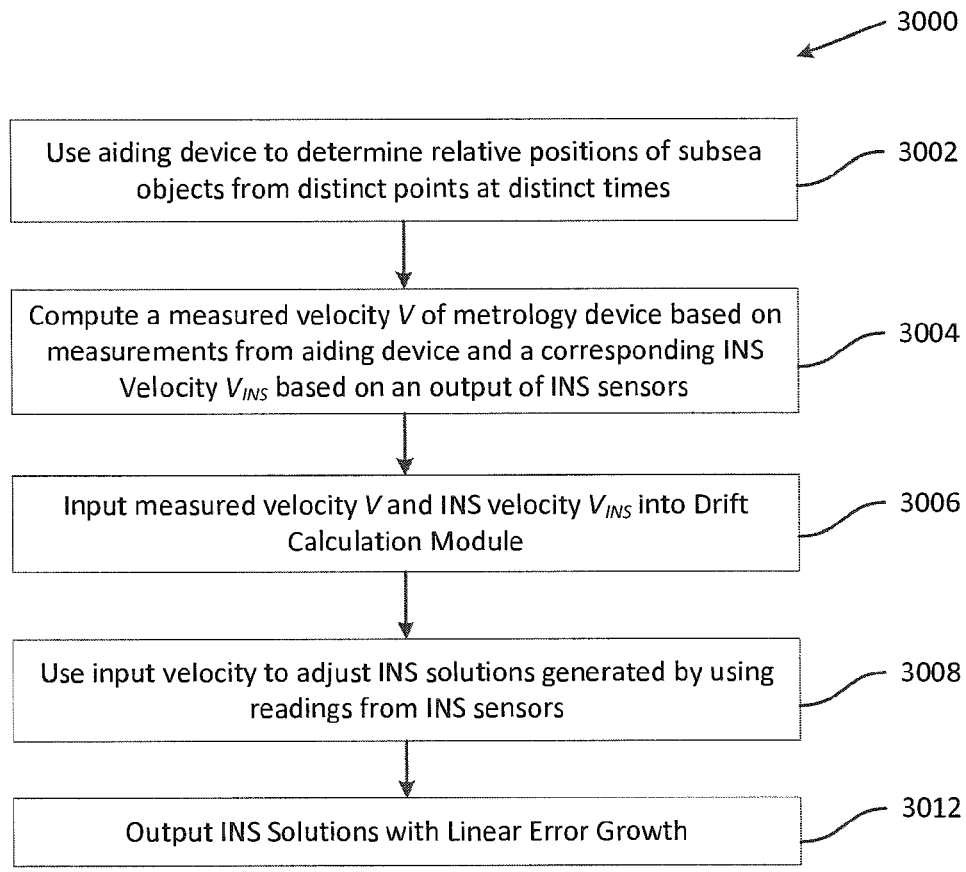
FIG. 11 is a flow diagram illustrating a Virtual Zero Velocity Updating process according to an embodiment of the invention.

Referring now to FIG. 11, VZUPT process 3000 employs the measured velocities to generate INS solutions with linear drift. This linearity in the drift is an important feature that can determine, or be an indicator of, the success of the whole metrology survey effort. First, the aiding device 106 (FIG. 1) is used to determine a plurality of relative positions of subsea objects from distinct points at distinct times (step 3002). As described above, this permits computation of a measured velocity V (step 3004). For each measured velocity V obtained from measurements made by aiding device 106, a corresponding INS velocity $V_{INS}$ is determined from an output of the accelerometers and gyroscopes of INS 102 from the corresponding times (step 3004). Measured velocity V and the INS velocity $V_{INS}$ are input into drift calculation module 504 (FIG. 5) (step 3006) to adjust INS solutions generated by INS 102 (step 3008). Various mathematical methods can be employed in step 3008 to adjust the INS solutions, including Kalman Filtering as discussed below, and other methods known in the art. The adjusted or corrected INS solutions are output from the drift calculation module 504 with linear error growth (step 3012). In some embodiments, the INS solutions with linear drift may be employed to navigate metrology device 100 along the path described above with reference to FIG. 10. One skilled in the art will recognize that in some embodiments, post-processing module 506 (FIG. 5) is employed to perform at least some of the calculations described below once a metrology survey is complete to adjust the INS solutions. Whether the INS solutions are adjusted in real time, or subsequent to a metrology survey, the adjusted INS solutions are described herein as having linear error growth or an apparent linear error growth with respect to time. One skilled in the art will recognize that the metrology device 100 may travel on a loop past first subsea object 2000 and second subsea object 2002 on the way to a target 2004, as illustrated in FIG. 9. The metrology device may also travel along a back-and-forth path between first subsea object 2000 and second subsea object 2002, as illustrated in FIG. 10. One skilled in the art will understand that the paths depicted, for example, in FIG. 9 and FIG. 10 are illustrative, and the precise path of the metrology device 100 is not restricted to one of the embodiments depicted herein.

Figure 12:
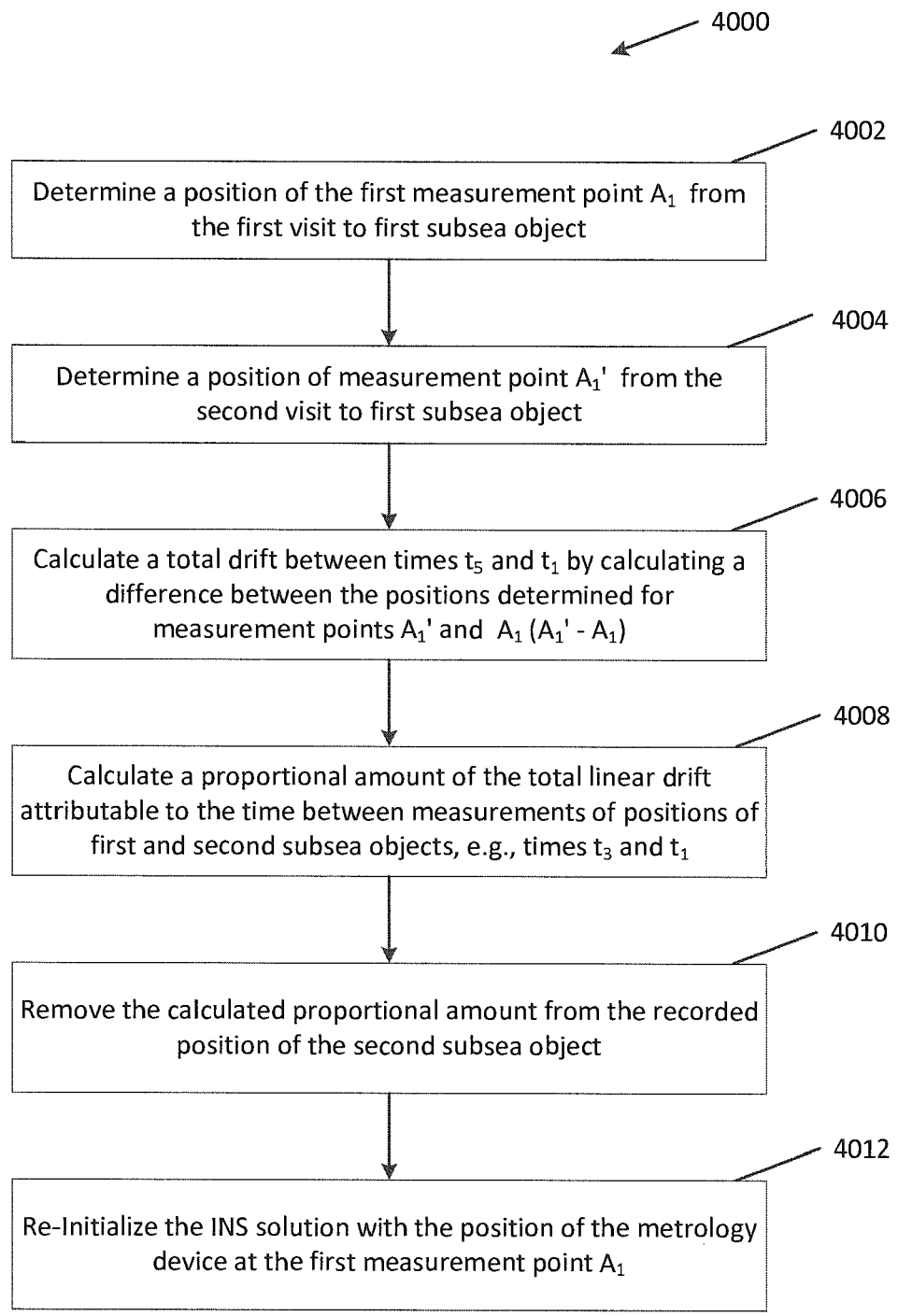
FIG. 12 is a flow diagram illustrating a Virtual Position Updating Process according to an embodiment of the invention.

As illustrated in FIG. 12, for example, VPUPT process 4000 employs the fact that the drift is linear to determine a more accurate position of second subsea object 2002 and to achieve other objectives. As is shown in FIG. 10, the metrology device 100 has a position $A_1$ for the first visit to the first subsea object 2000 at the beginning of the metrology loop. This position is determined and stored (step 4002). Metrology device 100 travels to second subsea object 2002, determines and records position $B_1$ at time $t_3$, and then returns to first subsea object 2000 and determines and stores position $A_1'$ at time $t_5$ (step 4004). As described above, the total drift $\Delta P$ can be represented by calculating a difference in the positions determined for the relevant measurement points according to equation (2) below (step 4006).

$$\Delta P = (A_1' - A_1) \qquad (2)$$

Because the drift increases linearly with respect to time, a proportional amount of the linear drift $D_{t3}$, which is attributable to the time taken to travel to position $B_1$ at time $t_3$ can be calculated according to equation (3) below (step 4008).

$$D_{t3} = \Delta P \cdot \frac{t_3 - t_1}{t_5 - t_1} \qquad (3)$$

This proportional amount of the drift $D_{t3}$ is removed from the recorded position of second subsea object 2002 to yield a more accurate position of second subsea object 2002 (step

4010). Furthermore, in the VPUPT process 4000, the INS solution at the first subsea object will be updated with the position $A_1$, effectively reinitializing the INS navigation solutions (step 4012).

In some embodiments, the above steps are repeated until a satisfactory number of estimates for the position of second subsea object 2002 are generated. Each metrology loop, e.g., moving metrology device 100 from first subsea object 2000 to second subsea object 2002 and returning to first subsea object 2000 to make optical measurements at measurement points $A_1$, $B_1$ and $A_1'$, will provide an independent reasonable estimate of the position of second subsea object 2002. As those skilled in the art will recognize, a greater number of metrology loops will provide users with greater redundancy and accuracy. In some embodiments, ten metrology loops are performed to provide ten independent estimates of the second subsea object, although more or fewer may be performed in some instances.

Embodiments of the method include collecting a first subsea object 2000 data from a metrology device controller 104. The data may include data from an aiding device 106 of the metrology device, such as position, range, orientation and image data of the first subsea object 2000 collected from a first measurement point relative to the first subsea object 2000 at a first time and a second measurement point at a second time. The data may further include data from an INS 102 of the metrology device 100, the data from the INS 102 including a first INS velocity of the metrology device 100 for a period between the first time and the second time. Embodiments of the method may further include collecting a second subsea object 2002 data from the metrology device controller 104, the second subsea object 2002 data including data from the INS 102 and aiding device 106 including position, range, orientation and image data of the second subsea object 2002 collected from a third measurement point relative to the second subsea object 2002 at a third time. In embodiments of the method, the second subsea object 2002 data further includes data from the aiding device 106 including position, range, orientation and image data of the second subsea object collected from a fourth measurement point relative to the second subsea object 2002 at a fourth time. The second subsea object 2002 data may further include data from the INS 102, including a second INS velocity of the metrology device 100 for a period between the third time and a fourth time.

Embodiments of the method may further include deriving a first measured velocity of the metrology device 100 from the first subsea object 2000 data collected from the aiding device 106 for the period between the first time and the second time; determining an estimate of a drift of the INS 102 at the third time from the first measured velocity and the first INS velocity; and removing the estimate of the drift from the second subsea object data collected from the INS to define a corrected second subsea object 2002 data and thereby perform a first virtual zero velocity update. Embodiments of the method may further include determining a relative position of the first subsea object with respect to the second subsea object by comparing the first subsea object data and the corrected second subsea object data to thereby perform a virtual position update. The measured velocities may be derived from multiple measurements of the relative positions of subsea objects.

Embodiments of the method may include deriving a second measured velocity of the metrology device 100 from the second subsea object 2002 data collected from the aiding device 106 for the period between the third time and the fourth time. The first subsea object 2000 data and second subsea object 2002 data may include multiple measurements of a relative position of the first and second objects with respect to the metrology device 100 taken from distinct measurement points at distinct times.

Embodiments may further include deriving a second measured velocity of the metrology device 100 from the second subsea object 2002 data, including data from the INS 102 and aiding device 106, such as position, range, orientation, and image data collected from a navigated measurement point $A_1'$ relative to the first subsea object 2000 at a fifth time. The navigated measurement point $A_1'$ is a point at which data from the INS 102 and aiding device 106 can be obtained for the first subsea object 2000 subsequent to collecting data from the second subsea object 2002.

Embodiments of the method include determining an estimate of the drift of the INS 102 at a fifth time from the second measured velocity and second INS velocity and removing the estimate of the drift at a fifth time from the navigated subsea object data and thereby performing a second zero velocity update, and calculating a total drift correction for the INS 102 using the difference between the first subsea object 2000 position and the corrected navigated first subsea object position.

As indicated above, Kalman filtering may be employed by the VZUPT process 3000 to remove the estimate of the drift and adjust the INS solutions in step 3008 described above with reference to FIG. 11. With Kalman filtering, the position of the metrology device 100 can be optimally estimated in real-time using a series of velocity or position measurements. An example Kalman filter model is expressed in matrix form by equations (4) and (5) below.

$$\dot{X} = FX + \omega \quad (4)$$

$$Y = HX + v \quad (5)$$

Here, X is the state vector and it includes INS data with errors in INS position, velocity and altitude, and $\dot{X}$ is the derivative of X with respect to time. F is the transfer matrix, and $\omega$ is the driving noise. The variable Y is an observation vector that can include velocities or positions observed with aiding device 106 corresponding in time to INS data in the state vector, H is the observation matrix that correlates the state vector to the observations and v is the observation noise. A best estimate of the INS error vector is given in equation (6) below.

$$\hat{x}(t_i) = K(Y - H\hat{X}(t_{i-1})) \quad (6)$$

Here, K is a variable known to those skilled in the art as the Kalman gain and $\hat{x}(t_i)$ is the estimated state vector at time $t_i$. Those best estimates of the INS error can then be removed from the INS solutions such that the INS solutions errors are low and grow or appear to grow linearly.

In use, the metrology device of embodiments of the current invention can be attached or transported by an underwater robotic vessel commonly used in offshore oil drilling, e.g. an AUV or ROV, but also may be transported by divers or other vehicle. The ROV may be equipped with Sonar, TV cameras, lights, manipulators, etc., and the metrology device of the embodiments of this invention. The ROV optionally provides electrical and communications interfacing for metrology device 100. As one skilled in the art will appreciate, the ROV has horizontal thrusters, vertical thrusters and lateral thrusters to allow for ROV maneuverability in all axes. The ROV also has robotic arms that can be used if needed to extend the device 100 over the receptacles or other objects to be scanned by the laser.

Metrology device 100 is mounted so that INS 102 is "fixed" to aiding device 106, i.e., complete 3D lever arms and boresight angles between the INS and the aiding device 106 are fixed, perfectly measured, and known. The submarine ROV or other vehicle or diver carries the metrology device 100 from one receptacle to the other, and aiding device 106 scans all surfaces located under the receptacle, while the INS 102 continuously records the 3D position and orientation of the laser source. All data is precisely time tagged. When "flying" over each receptacle the INS 102 and aiding device 106 collect a cloud of laser points corresponding to the image of the receptacle, each point having a 3D position computed by the system. Other objects, structures, and areas of the seafloor can be scanned in the process, as extra information to be collected for the client. The system will continuously fly back and forth between the two receptacles, collecting data for each receptacle, e.g., several iterations might be desired. At the end, the recorded data of all types is transmitted to a control center using, e.g., transceiver 210 and/or a communications link on ROV.

Once the data has been recorded it can be processed at the control center on the surface vessel or onshore (depending how close to real time the results are needed), so that an image of each receptacle will be reconstituted. Successive images of each receptacle will be joined (superimposed—i.e. "collocated") either manually or electronically so that the known relatively fixed locations of the receptacles or other reference points can be computed to anchor the position of the INS. Once these fixed relative locations are determined, drift can be calculated using the time-stamped INS data, because the drift is the difference in location between two images of the same object. Once the drift is precisely computed (the distance between the two images of the same object is known) it can be removed from the INS navigation solution, resulting in an accurate navigation solution, and an accurately located survey and laser images of all the structures surveyed. In this way the inertial navigation drift has been corrected by the use of a scanning laser or other device to update its position regularly, without touching any hard structure at the bottom: hence the name of "touchless" inertial metrology. As one skilled in the art will also appreciate, after the initial calculation of the drift, survey data from the data field can be gathered, and any error in the position readings caused by the drift can be removed by making use of the apparent differences in the position of the initial structure observed by returning and/or re-measuring the initial structure. Accordingly, the invention may save time and survey expense.

As one skilled in the art will appreciate, the functions of all components of certain embodiments of the invention may execute within the same hardware as the other components, or each component may operate in a separate hardware element. For example, the data processing, data acquisition/logging, and data control functions of embodiments of the present invention can be achieved via separate components or all combined within the same component.

In embodiments of methods, the survey is to be conducted without touching any of the underwater structures being measured. The underwater structures are therefore measurable while the metrology device is in motion with respect to the underwater structures.

The present application is a non-provisional application which claims priority to and the benefit of U.S. Provisional Patent Application No. 62/044,494 filed on Sep. 2, 2014, titled "Devices, Program Products and Computer Implemented Methods for Touchless Metrology Having Virtual Zero-Velocity and Position Update" and U.S. Provisional Patent Application No. 61/877,504 filed on Sep. 13, 2013, titled "Devices, Program Products and Computer Implemented Methods for Touchless Metrology Having Virtual Zero-Velocity and Position Update." The present application is also a continuation-in-part of U.S. patent application Ser. No. 13/752,806, filed on Jan. 29, 2013, titled "A Device, Program Product and Computer Implemented Method for Touchless Metrology Using an Inertial Navigation System and Laser," which is a continuation of U.S. patent application Ser. No. 12/856,404, filed Aug. 13, 2010, which is now U.S. Pat. No. 8,380,375, titled "A Device, Computer Storage Medium, and Computer Implemented Method for Metrology Using an Inertial Navigation System and Aiding" which claims priority to U.S. Provisional Patent Application Ser. No. 61/234,062, filed on Aug. 14, 2009, titled "A Device and Method for Touchless Inertial Metrology Using an Inertial Navigation System and Laser," each of which is incorporated herein by reference in its entirety.

Moreover, the drawings and specification have disclosed certain embodiments of the invention, and although some specific terms are employed, the terms are used in a descriptive sense only and not for the purposes of limitation. The invention has been described in considerable detail with specific reference to these illustrated embodiments. It will be apparent, however, that various modifications and changes can be made within the spirit and scope of the invention as described in the foregoing specification and as defined in the attached claims.

That claimed is:

1. A computer-implemented method of surveying a plurality of subsea objects with a metrology device including an inertial navigation system (INS) operable to output INS data including accelerometer and gyroscope data associated with a position and orientation of the metrology device and an aiding device operable to output distance and orientation data of the plurality of subsea objects with respect to the metrology device, the computer-implemented method comprising:

navigating the metrology device to a first measurement point, and collecting, at a first time, first subsea object data from the first measurement point including a relative position of the first subsea object with respect to the first measurement point;

navigating the metrology device to a second measurement point, and collecting, at a second time, first subsea object data from the second measurement point including a relative position of the first subsea object with respect to the second measurement point;

navigating the metrology device to a third measurement point and collecting, at a third time, second subsea object data from the third measurement point including a relative position of a second subsea object with respect to the third measurement point;

navigating the metrology device to a fourth measurement point and collecting, at a fourth time, second subsea object data from the fourth measurement point including a relative position of a second subsea object with respect to the fourth measurement point;

calculating a measured velocity of the metrology device between at least one of the first and second measurement points and the third and fourth measurement points using the collected relative positions of the first and second subsea objects with respect to respective measurement points and a difference between respective times;

correcting the INS data with the measured velocity such that a drift of the INS data grows generally linearly with time;

subsequent to the fourth time, navigating the metrology device to a navigated measurement point in which data output from the INS and data from the aiding device can be collected from the first subsea object, and collecting, at a fifth time, first subsea object data including a relative position of the first subsea object with respect to the navigated measurement point;

calculating a drift correction for the INS data using the difference between the collected relative positions of the first subsea object position with respect to the first and navigated measurement points;

determining a proportion of the drift correction corresponding to a proportion of time elapsed between the first and third times and time elapsed between the first and fifth times; and correcting the collected relative position of the second subsea object using the determined proportion of the drift correction.

2. A computer-implemented method as defined in claim 1, wherein the correcting the INS data comprises employing Kalman filtering of the measured velocity and a corresponding velocity derived from the INS data.

3. A computer-implemented method as defined in claim 1, wherein the first and second measurement points are remote from the first subsea object such that collecting the first subsea object data is touchless with respect to the metrology device and the first subsea object, and wherein the metrology device is in motion at the first and second times.

4. A computer-implemented method as defined in claim 1, wherein the step of correcting the INS data is performed subsequent to completing a metrology loop, and wherein the metrology loop comprises the steps of navigating the metrology device to the first, second, third, fourth, and navigated measurement points and collecting first and second subsea object data from the respective measurement points.

5. A computer-implemented method as defined in claim 1, further comprising updating the INS data representing the metrology device at the navigated measurement point with the calculated drift correction to reinitialize the INS.

6. A computer-implemented method as defined in claim 5, further comprising performing an additional metrology loop with the reinitialized INS to provide an independent estimate of the position of second subsea object, the additional metrology loop comprising repeating the steps of navigating the metrology device to the first, second, third, fourth and navigated measurement points and collecting first and second subsea object data from the respective measurement points.

7. A computer-implemented method for surveying a plurality of subsea objects and a process of correcting a measured position of the plurality of subsea objects, the computer-implemented method comprising:

collecting a first subsea object data from a metrology device controller, the first subsea object data including:
data from an aiding device of the metrology device, the data from the aiding device including position, range, orientation and image data of the first subsea object collected from a first measurement point relative to the first subsea object at a first time and a second measurement point at a second time; and
data from an inertial navigation system (INS) of the metrology device, the data from the INS including a first INS velocity of the metrology device for a period between the first time and the second time;

collecting a second subsea object data from the metrology device controller, the second subsea object data including data from the INS and aiding device including position, range, orientation and image data of the second subsea object collected from a third measurement point relative to the second subsea object at a third time;

deriving a first measured velocity of the metrology device from the first subsea object data collected from the aiding device for the period between the first time and the second time;

determining an estimate of a drift of the INS at the third time from the first measured velocity and the first INS velocity;

removing the estimate of the drift from the second subsea object data collected from the INS to define a corrected second subsea object data and thereby perform a first virtual zero velocity update; and determining a relative position of the first subsea object with respect to the second subsea object by comparing the first subsea object data and the corrected second subsea object data to thereby perform a virtual position update.

8. A computer-implemented method as defined in claim 7, wherein the removing an estimate of the drift of the INS comprises employing Kalman filtering of the measured velocity and the INS velocity.

9. A computer-implemented method as defined in claim 7, wherein the second subsea object data further includes:
data from the aiding device including position, range, orientation and image data of the second subsea object collected from a fourth measurement point relative to the second subsea object at a fourth time; and
data from the INS, the data from the INS including a second INS velocity of the metrology device for a period between the third time and the fourth time; and wherein the method further comprises the steps of:

deriving a second measured velocity of the metrology device from the second subsea object data collected from the aiding device for the period between the third time and the fourth time;

collecting a navigated first subsea object data from the metrology device controller, the navigated first subsea object data including data from the INS and aiding device including position, range, orientation and image data of the first subsea object collected from a navigated measurement point relative to the first subsea object at a fifth time, wherein the navigated measurement point is a point at which INS data and data from the aiding device can be obtained for the first subsea object subsequent to collecting the second subsea object data;

determining an estimate of a drift of the INS at the fifth time from the second measured velocity and the second INS velocity;

removing the estimate of the drift at the fifth time from the navigated subsea object data collected from the INS to define a corrected navigated first subsea object data and thereby perform a second virtual zero velocity update; and calculating a total drift correction for the INS using the difference between the first subsea object position and the corrected navigated first subsea object position.

10. A computer-implemented method as defined in claim 9, wherein determining an estimate of the drift of the INS at the third time comprises determining a proportion of the total drift correction attributable to the collecting the second subsea object data at the third time by determining a proportion of time elapsed between first time and the third time with respect to the time elapsed between the first time and the fifth time.

11. A computer-implemented method as defined in claim 9, further comprising updating the INS data representing the metrology device at the navigated measurement point with the calculated total drift correction to reinitialize the INS.

12. A computer-implemented method as defined in claim 7, wherein the first subsea object data from the aiding device and the second subsea object data from the aiding device includes multiple measurements of a relative position of the first and second objects with respect to the metrology device taken from distinct measurement points at distinct times, and wherein the measured velocity is derived from the multiple measurements of the relative position.

13. A computer-implemented method as defined in claim 9, wherein the metrology device is integrated into a remote operated vehicle (ROV), and the computer-implemented method performs the operation of:
    navigating the ROV to the first and second measurement points and collecting the first subsea object data from the aiding device at the first and second measurement points;
    navigating the ROV to the third measurement point and collecting the second subsea object data from the aiding device at the third measurement point;
    navigating the ROV to the fourth measurement point and collecting the second subsea object data from the aiding device at the fourth measurement point and subsequently;
    navigating the ROV to the navigated measurement point by moving the ROV until data from the INS and data from the aiding device can be obtained relative to the first subsea object.

14. A computer-implemented method as defined in claim 13, wherein the computer-implemented method further performs the operation of:
    updating the data from the INS representing the ROV at the navigated measurement point with a corrected measured position of the ROV at the navigated measurement point to reinitializing the INS.

15. A metrology device comprising:
    an inertial navigation system (INS), including one or more gyroscopes and one or more accelerometers, adapted to be transported, and to output position and orientation data;
    an aiding device to record image data, and being configured to output distance and orientation data between subsea objects and the metrology device;
    a controller, including one or more processors and non-transitory memory to store the position and orientation data from the INS and the distance and orientation data from the aiding device together with time tag data indicating when the data was output from the INS before storage and when the data was output from the aiding device before storage; and
    a computer defining a control center computer and being in communication with the controller, the control center computer having one or more processors and non-transitory memory, the memory having computer readable instructions stored therein that when executed cause the control center to execute the instructions of:
        measuring, responsive to collecting (a) first subsea object data from the controller, the first subsea data including data from the INS and aiding device including first object position, range and orientation data, and image data; (b) second subsea object data from the controller, the second subsea data including data from the INS and aiding device including second object position, range and orientation data, and image data; and (c) navigated first subsea object data from the controller, the navigated first subsea object data including data from the INS and aiding device including navigated first object position, range and orientation data, and image data, a difference in the position of the navigated first object position and the first object position;
    deriving a measured velocity of the metrology device from at least one of the first subsea object data from the aiding device, the second subsea object data from the aiding device, and the navigated first subsea object data from the aiding device;
    correcting data from the INS with the measured velocity such that a drift of the data from the INS grows generally linearly with time;
    calculating a drift correction for the INS responsive to a difference between the first subsea object position and the navigated first subsea object position;
    measuring a target position responsive to collecting target object data from the controller;
    determining a proportion of the drift correction attributable to the measurement of the target position by determining a proportion of time elapsed between measuring the first subsea object data and the target object data; and
    correcting the measured position of the target responsive to the determined proportion of the drift correction.

16. A metrology device as defined in claim 15, wherein the aiding device comprises a laser camera, and wherein the laser camera comprises one or more flash laser cameras.

17. A metrology device as defined in claim 15, wherein the metrology device is integrated into a remote operated vehicle (ROV), and the control center computer further performs the operation of:
    navigating the ROV to the first measurement point and collecting the first subsea object data from the aiding device at the first measurement point;
    navigating the ROV to a second measurement point with respect to the second object and collecting the second subsea object data from the aiding device at the measurement point with respect to the second object; and subsequently;
    navigating the ROV to the navigated measurement point by moving the ROV until both data from the INS and data from the aiding device for the first subsea object can be obtained subsequent to navigating the ROV to the second measurement point.

18. A metrology device as defined in claim 17, wherein the control center computer further performs the operation of:
    updating the data from the INS representing the ROV at the navigated measurement point with a corrected measured position of the ROV at the navigated measurement point to reinitialize the INS.

* * * * *

UNITED STATES PATENT AND TRADEMARK OFFICE
CERTIFICATE OF CORRECTION

| | | |
|---|---|---|
| PATENT NO. | : 9,255,803 B2 | Page 1 of 1 |
| APPLICATION NO. | : 14/482150 | |
| DATED | : February 9, 2016 | |
| INVENTOR(S) | : Ziwen Wayne Liu et al. | |

It is certified that error appears in the above-identified patent and that said Letters Patent is hereby corrected as shown below:

In the Claims

In Column 20, Line 12, Claim 7, the last word appears as "obj ect" and should read --object--.

Signed and Sealed this
Third Day of May, 2016

Michelle K. Lee
*Director of the United States Patent and Trademark Office*